(12) United States Patent
Lin et al.

(10) Patent No.: US 7,619,613 B2
(45) Date of Patent: Nov. 17, 2009

(54) COMPUTER WIRELESS INPUT DEVICE WITH COMPARTMENT FOR RETAINING A WIRELESS RECEIVER

(75) Inventors: Li-Wen Lin, San Chong (TW); Zhen-Bang Chen, San Chong (TW); Sheng-Shan Huang, San Chong (TW)

(73) Assignee: KYE Systems Corp. (TW)

( * ) Notice: Subject to any disclaimer, the term of this patent is extended or adjusted under 35 U.S.C. 154(b) by 572 days.

(21) Appl. No.: 11/021,153

(22) Filed: Dec. 23, 2004

(65) Prior Publication Data

US 2006/0139329 A1    Jun. 29, 2006

(51) Int. Cl.
*G09G 5/08* (2006.01)
(52) U.S. Cl. ...................................... 345/163
(58) Field of Classification Search ................ 345/156, 345/157, 163
See application file for complete search history.

(56) References Cited

U.S. PATENT DOCUMENTS

| 7,187,361 B2 * | 3/2007 | Wang ................... 345/163 |
| 2003/0179177 A1 | 9/2003 | Wang |

OTHER PUBLICATIONS

Nintendo, Compact Video Game System Owner's Manual, 1990, Nintendo Co. LTD.*

* cited by examiner

*Primary Examiner*—Amare Mengistu
*Assistant Examiner*—Robert Rainey
(74) *Attorney, Agent, or Firm*—Raymond Sun

(57) ABSTRACT

An input device has a body for receiving a circuit board therein. The body has a retaining device which is moved to secure or release a wireless receiver in or from an exterior-facing compartment in the body.

5 Claims, 5 Drawing Sheets

COMPUTER WIRELESS INPUT DEVICE WITH COMPARTMENT FOR RETAINING A WIRELESS RECEIVER

BACKGROUND OF THE INVENTION

1. Field of the Invention

The present invention relates to a computer input device, and in particular, to a wireless device that can retain a wireless receiver within the wireless device.

2. Description of the Prior Art

The use of computer wireless input devices has grown quickly following the rapid advancement of wireless technology. In general, a wireless input device needs a wireless signal receiver to communicate with a computer system or the like. However, due to the minimization of the size of wireless input devices and the wireless receiver thereof, the disposition or storage of a wireless receiver has become a serious problem because of the risk of accidentally misplacing or losing the wireless receiver.

US Publication No. 2003/01791777 discloses a device having an opened chamber located within the housing where a sliding receptacle 26 has a flexible retaining arm 263 which is provided for clamping a wireless receiver 11 that is inserted within the housing. However, the installation of the receptacle can be costly and difficult to assemble with the housing. In addition, the flexibility of the retaining arm 263 can be deteriorated after extended usage.

SUMMARY OF THE DISCLOSURE

It is an object of the present invention to provide a wireless input device which can effectively retain a wireless receiver therein.

It is another object of the present invention to provide a retaining device for use with a wireless input device, with the retaining device being capable of shutting off the power supply of the wireless input device.

It is yet another object of the present invention to provide a retaining device for a wired input device that can retain a portable storage device within the wired device.

To accomplish the objectives of the present invention, the present invention provides an input device that has a body for receiving a circuit board therein. The body has a retaining device which is moved to secure or release a wireless receiver in or from an exterior-facing compartment in the body.

DETAILED DESCRIPTION OF THE PREFERRED EMBODIMENTS

Figure 1:
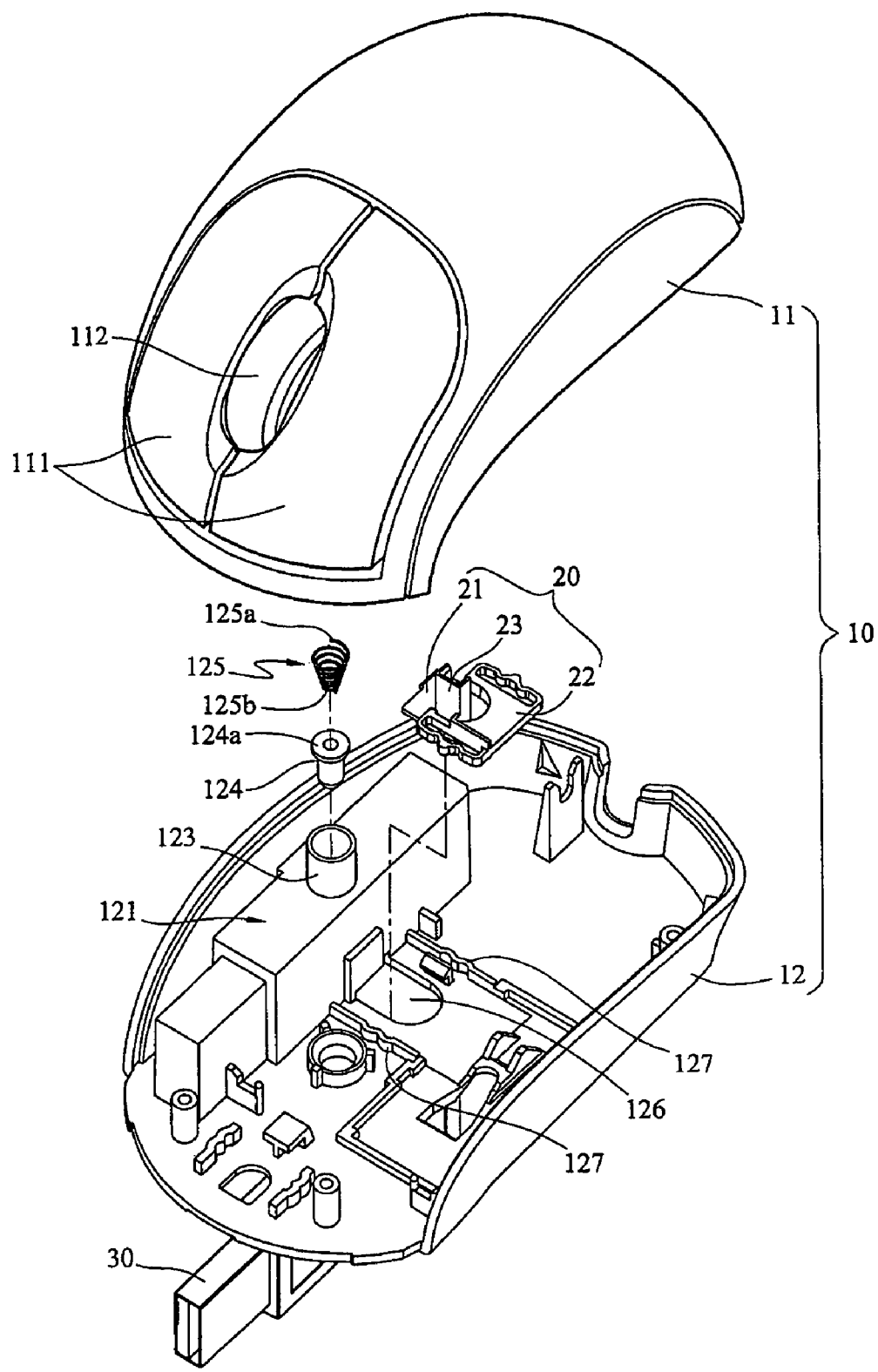
FIG. 1 is an exploded perspective view of an input device according to one embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Referring to FIGS. 1-8, the present invention provides an input device (e.g., such as a mouse) which has a body 10 for receiving a circuit board 40 therein. The body 10 has an upper housing 11 and a lower housing 12. The upper housing 11 has buttons 111 and a roller 112 for use in controlling the input device in a manner well-known to those skilled in the art.

Figure 3:
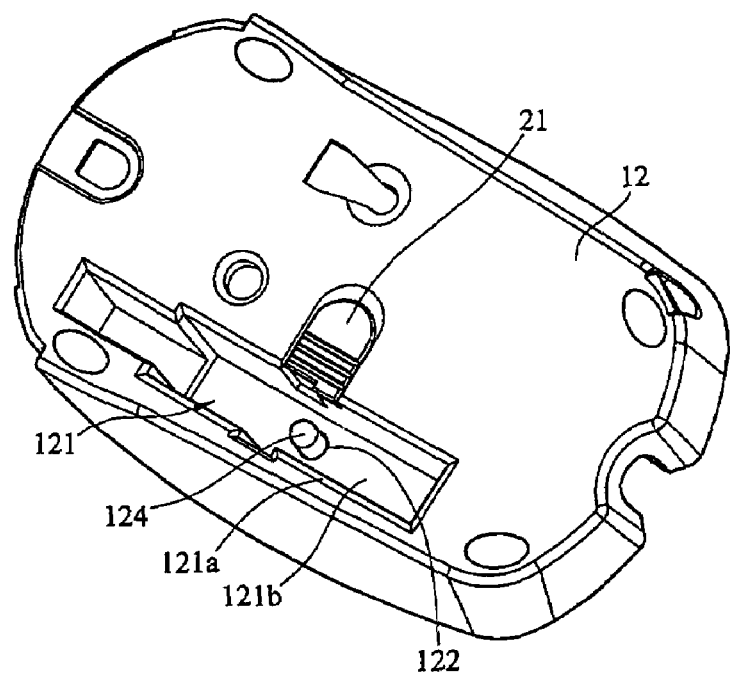
FIG. 3 is a bottom perspective view of the device of FIG. 1.

The lower housing 12 has a compartment 121 with an opening 121a that extends exteriorly from the bottom of the lower housing 12 (see FIG. 3). The bottom 121b of the compartment 121 has a hole 122 which communicates with a containing bore 123 (see FIGS. 1 and 5). The bore 123 contains a lifting device which has a rod 124 and a resilient element 125. The rod 124 has a rim 124a having a diameter larger than that of the hole 122, thereby allowing the rod 124 to be extended for up-down movement through the hole 122 and within the bore 123, with the rim 124a retained inside the bore 123. The resilient element 125 has a fixed end 125a and an opposite moving end 125b which is coupled to the rim 124a of the rod 124. When the upper housing 11 is coupled to the lower housing 12, an annular sleeve 113 which extends from the inner surface of the upper housing 11 will seal the top of the bore 123 and secure the fixed end 125a of the resilient element 125. Therefore, when the rod 124 is pushed from the compartment 121 (e.g., by a wireless receiver 30 as described below), the rod 124 can be forced inside the bore 123. However, when the pushing force is released from the rod 124, the resilient element 125 naturally biases the rod 124 back into the compartment 121 again.

Figure 2:
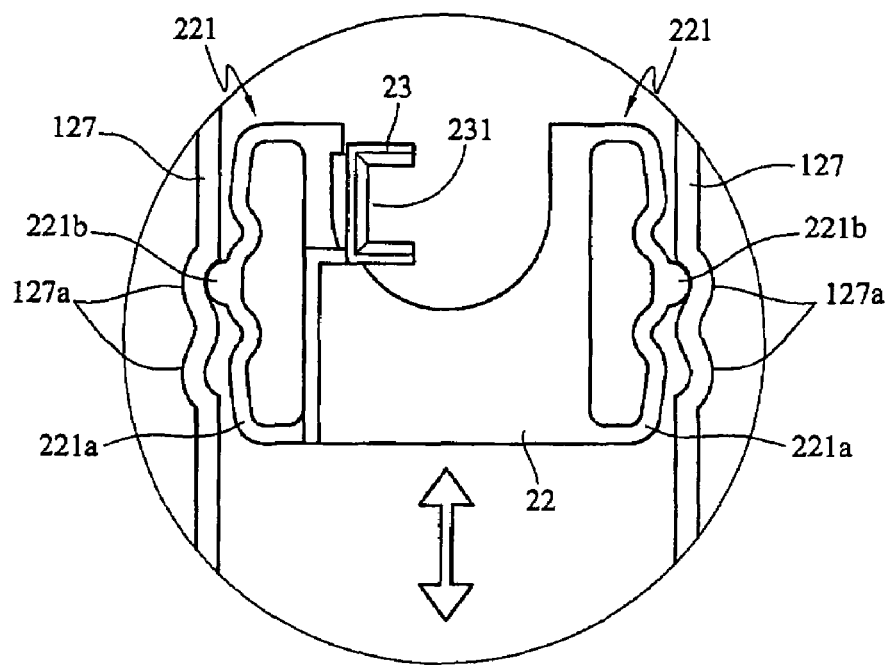
FIG. 2 is an enlarged sectional view of a positioning board of the device of FIG. 1.

In addition, referring to FIGS. 1 and 2, the lower housing 12 has an opening 126 adjacent to the compartment 121. A rail 127 is positioned on each side of the opening 126 in parallel, with each rail 127 having two spaced-apart dents 127a.

Figure 4:
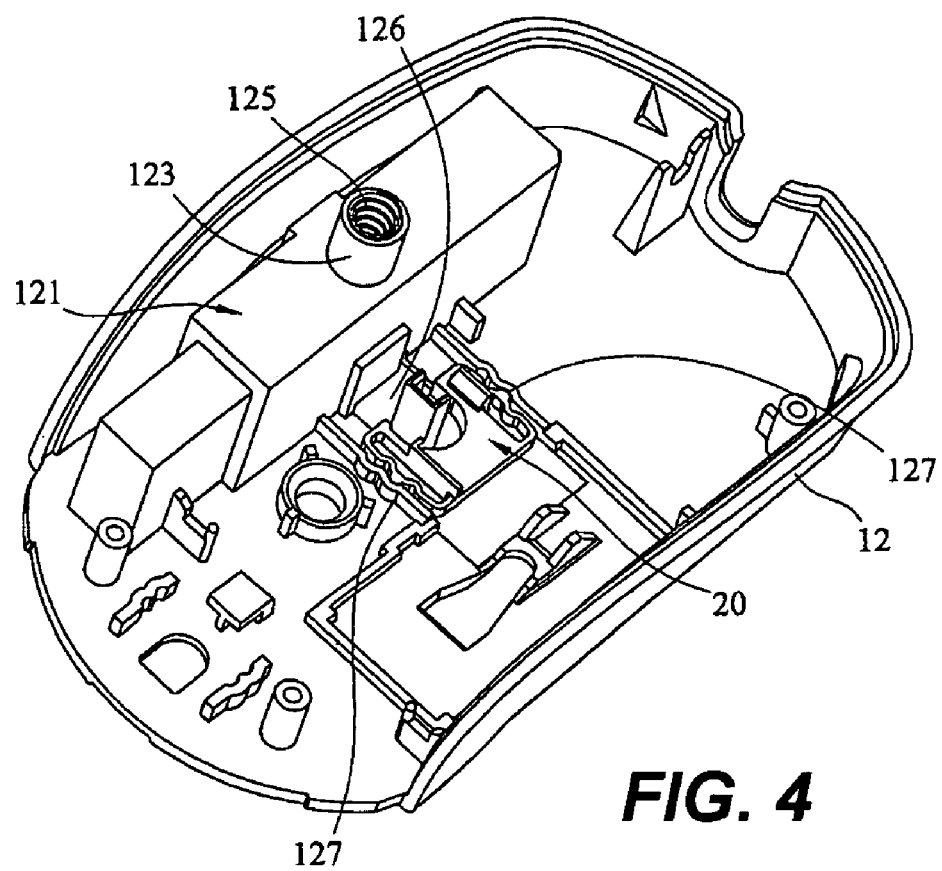
FIG. 4 is a perspective view of the components in the lower housing of the device of FIG. 1.
Figure 5:
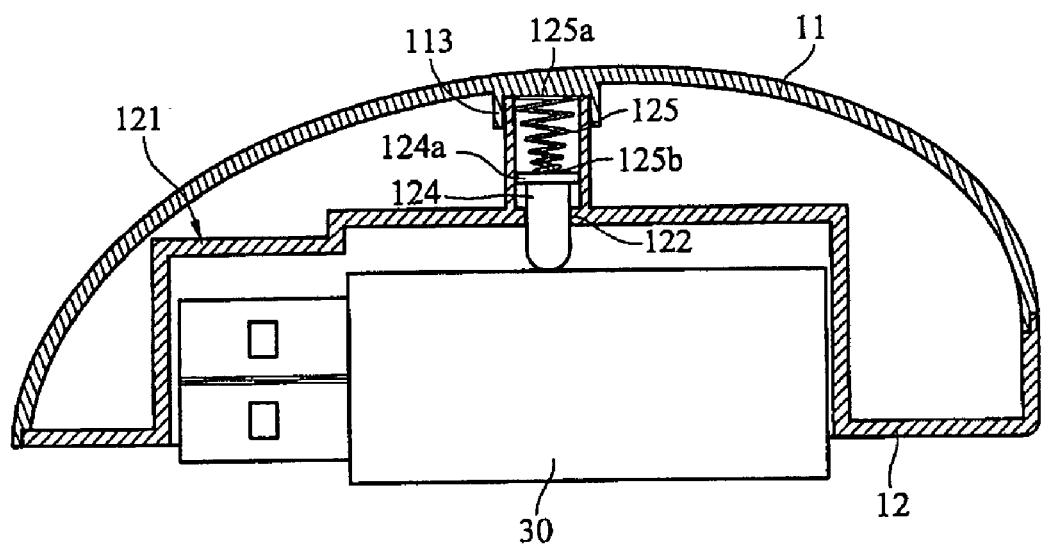
FIG. 5 is a cross-sectional view of the device of FIG. 1.
Figure 6:
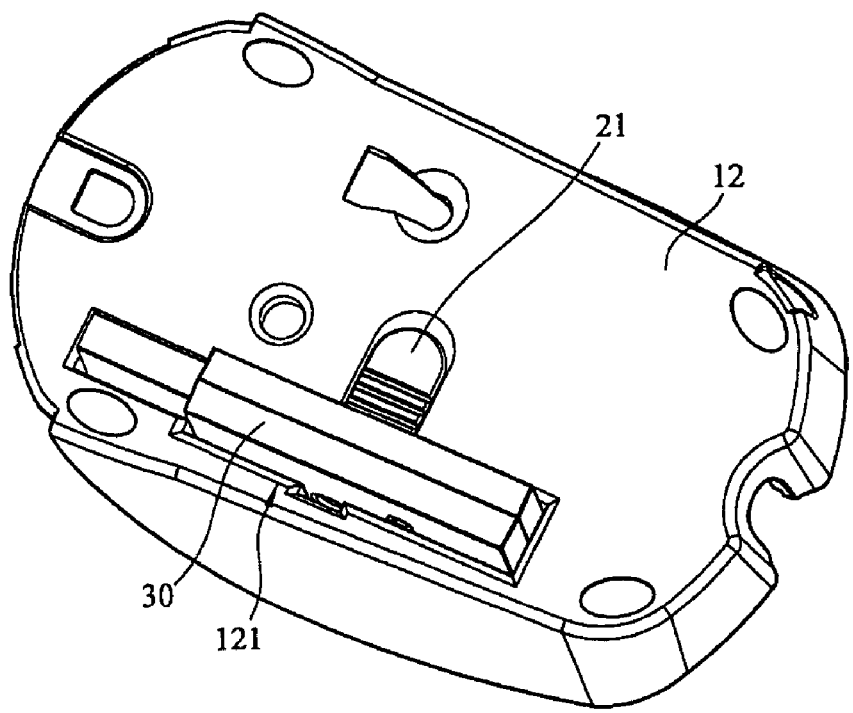
FIGS. 6-7 are bottom perspective views of the device of FIG. 1 illustrating the operation thereof.
Figure 7:
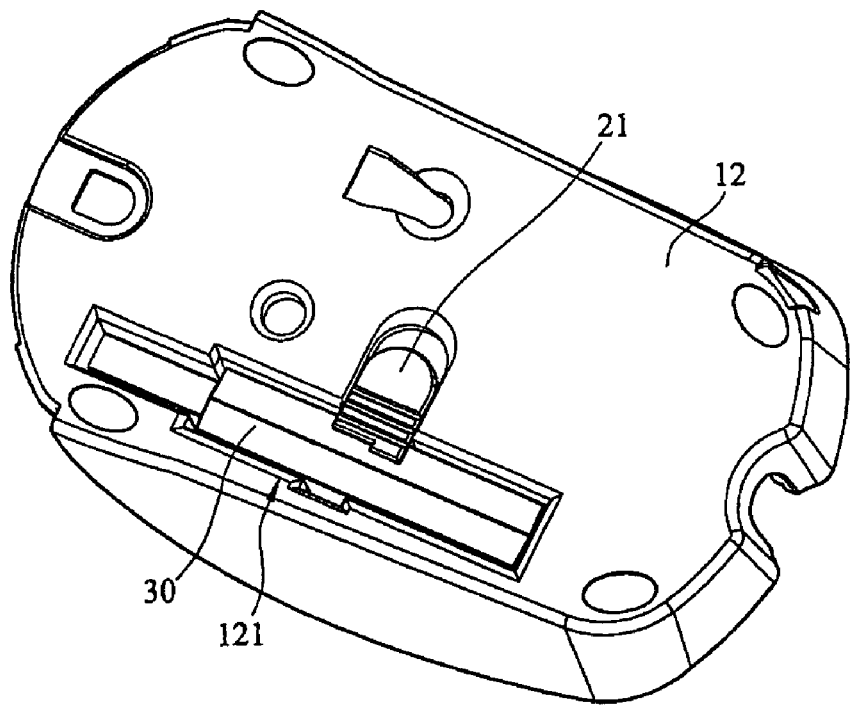
Figure 8:
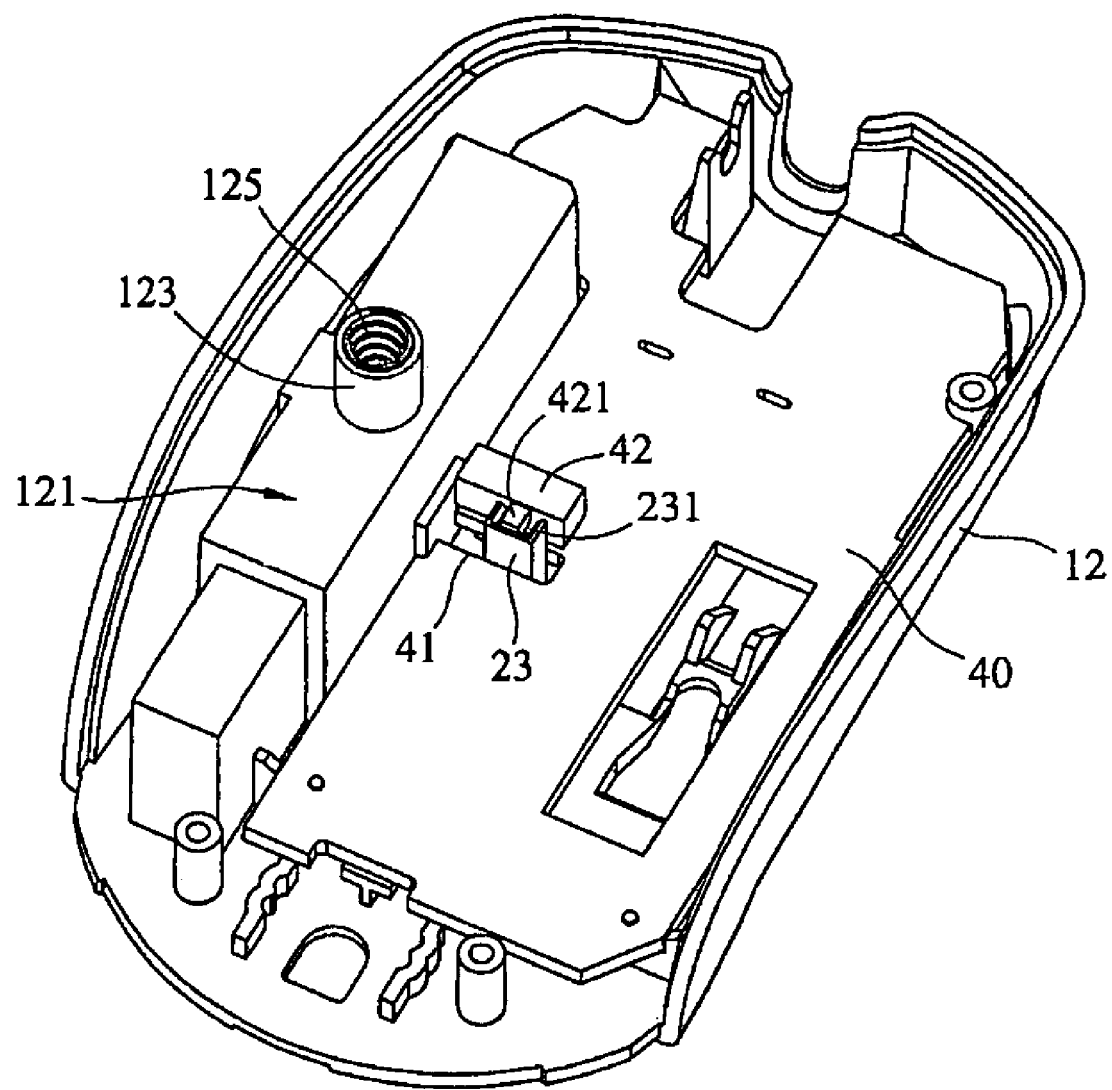
FIG. 8 is a top perspective view of the components in the lower housing of the device of FIG. 1 showing the assembly of a circuit board therein.

As best shown in FIG. 1, a retaining device 20 is operationally positioned at the opening 126. The retaining device 20 includes a slider 21, a positioning board 22 and a link 23. The slider 21 is positioned outside the lower housing 12 at the bottom threreat (as shown in FIGS. 3 and 6), and the slider 21 can block the compartment 121 in a locking position shown in FIG. 7. The positioning board 22 is located inside the lower housing 12 and positioned between the rails 127, as best shown in FIG. 4. Referring to FIG. 2, the positioning board 22 has a pair of opposite positioning portions 221, with each positioning portion 221 having a resilient wing 221a and a knob 221b protruding therefrom. Each knob 221b is adapted to be received in one of the dents 127a in the same rail 127. The link 23 is a generally U-shaped structure that defines a groove 231. The link 23 extends from the slider 21 so as to penetrate the opening 126 and a slit 41 (see FIG. 8) in the circuit board 40 to couple to a lever 421 of a microswitch 42 that is positioned adjacent to the slit 41 on the circuit board 40. In particular, the lever 421 is retained in the groove 231 of the link 23 to be controlled by the link 23. The microswitch 42 controls the power supply of the input device. If a user deactivates the microswitch 42, the input device will be shut off completely.

In operation, as best shown in FIG. 2, the slider 21 can be slid between the rails 127 between a locking position and an unlocked position. At each of the locking and unlocked positions, each knob 221b will be secured in a corresponding dent 127a to maintain the slider 21 in a fixed position. However, the resiliency and flexibility of the wings 221a enable the knobs 221b to be disengaged from the dents 127a so that the slider 21 can move back and forth between the rails 127, and between the two dents 127*a* along each rail 127.

Referring to FIGS. 5-8, when a user places a wireless receiver 30 into the compartment 121, the receiver 30 pushes the rod 124 into the bore 123. Then, the user moves the slider 21 to the locking position (see FIG. 7) to secure the receiver 30 within the compartment 121. When the slider 21 is moved to the locking position, the positioning board 22 and the link 23 carried thereon is also moved, with the link 23 in turn moving the lever 421 of the microswitch 42 to deactivate the microswitch 42, thereby shutting off the input device completely.

When the user wishes to remove the wireless receiver 30 from the compartment 121, the user moves the slider 21 to an unlocked position (see FIG. 6) so as to unblock the receiver 30 within the compartment 121. At this time, the resilient element 125 will automatically bias the rod 124 into the compartment 121 to push the receiver 30 out of the compartment 121. When the slider 21 is moved to the unlocked position, the positioning board 22 and the link 23 carried thereon is also moved, with the link 23 in turn moving the lever 421 of the microswitch 42 to activate the input device, placing the input device into a standby status for use.

Even though the present invention illustrates the slider 21 as operating based on linear movement, it is possible to deploy the slider 21 using rotary movement. Once a user rotates the slider 21 to block the compartment 121 and retain the receiver 30 therein, the microswitch 42 can be deactivated accordingly. Then, when the user rotates the slider 21 to release the retained receiver 30 therein, the microswitch 42 can be activated accordingly.

The principles of the present invention can also be applied to a wired input device. In such an application, the wireless receiver 30 can be a portable storage device (such as a pen drive), and the compartment 121 can retain the pen drive in the wired input device for any further usage.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A wireless input device, comprising:
   a body;
   a circuit board retained inside the body and having a power switch;
   a compartment associated with the body, the body having a first opening extending exteriorly to the body, with a bore provided adjacent the compartment and communicating with the compartment via a second opening;
   a wireless receiver removably retained in the compartment; and
   a retaining device having a slider, a positioning board and a link extending from the positioning board, the link is oriented in a different plane than the slider and the positioning board, the slider extending outside the body via the opening and the positioning board positioned inside the body;
   a lifting device comprising a rod and a resilient element that are housed in the bore, the rod being biased into the compartment by the resilient element via the second opening;
   wherein the positioning board and the link are housed inside the body with the positioning board positioned between the circuit board and the body, and with the link extending in a sliding movement from the positioning board through a slit in the circuit board to control the power switch; and
   wherein the receiver is stored in the compartment by pressing the receiver into the compartment against the rod, and by sliding the slider along the exterior of the body to block the receiver when the receiver is retained in the compartment;
   wherein the positioning board has a resilient positioning portion.

2. The device of claim 1, wherein the positioning board is positioned between two rails, with a hooked member positioned adjacent one of the rails, the hooked member extending through an elongated opening on the positioning board.

3. The device of claim 1, wherein the power switch has a lever that is positioned adjacent to the slit of the circuit board, with the link defining a groove inside which the lever is retained.

4. The device of claim 1, wherein the body has an upper housing and a lower housing, with the bore located on the lower housing, and wherein the upper housing has a sleeve that seals the bore.

5. The device of claim 1, wherein the positioning board is positioned between two rails, with a hooked member positioned adjacent one of the rails, the hooked member extending through an elongated opening on the positioning board.

* * * * *